(12) United States Patent
Kemp

(10) Patent No.: US 8,469,746 B2
(45) Date of Patent: Jun. 25, 2013

(54) COMPUTER ADAPTER WITH POWER OUTLET AND REPLACEABLE AND RECHARGEABLE BATTERY, WIRELESS CARD, AND TRANSCEIVER

(76) Inventor: James Kemp, Miami, FL (US)

( * ) Notice: Subject to any disclaimer, the term of this patent is extended or adjusted under 35 U.S.C. 154(b) by 0 days.

(21) Appl. No.: 13/474,230

(22) Filed: May 17, 2012

(65) Prior Publication Data
US 2012/0256484 A1 Oct. 11, 2012

Related U.S. Application Data

(63) Continuation of application No. 13/084,498, filed on Apr. 11, 2011.

(51) Int. Cl.
*H01R 31/06* (2006.01)

(52) U.S. Cl.
USPC ......................................................... 439/628

(58) Field of Classification Search
USPC ........ 439/628, 638–639, 502, 505; 174/74 R, 174/78
See application file for complete search history.

(56) References Cited

U.S. PATENT DOCUMENTS

| | | | |
|---|---|---|---|
| 7,462,073 B2 | 12/2008 | Bell et al. | |
| 7,685,453 B2* | 3/2010 | Yang et al. | 713/340 |
| 8,043,122 B1* | 10/2011 | Cho et al. | 439/638 |
| 8,086,281 B2* | 12/2011 | Rabu et al. | 455/573 |
| 8,149,570 B2* | 4/2012 | Keebler et al. | 361/622 |
| 2003/0222503 A1* | 12/2003 | Lam et al. | 307/38 |
| 2005/0060467 A1* | 3/2005 | Wieck | 710/303 |

* cited by examiner

*Primary Examiner* — Jean F Duverne
(74) *Attorney, Agent, or Firm* — Robert J. Sayfie

(57) ABSTRACT

The present invention is directed to an electronic adapter that has a receptacle capable of receiving power cords and power a device, such as a computer. The present invention may have a rechargeable and replaceable battery. In addition to allowing access to a power receptacle from a single power source, the present invention eliminates the need to carry an extra extension cord to allow multiple users to power their accessories, i.e. notebook computers from a single power source. The present invention may also have a wireless card allowing devices connected to the USB port to gain access to a WIFI network. A transceiver may allow the adapter to be turned off remotely.

3 Claims, 2 Drawing Sheets

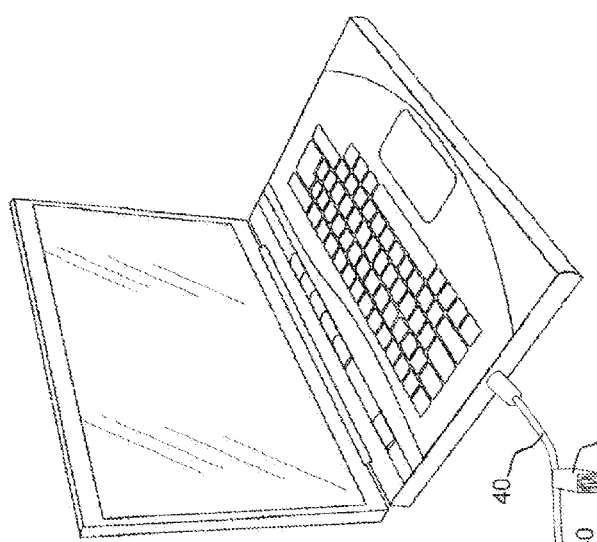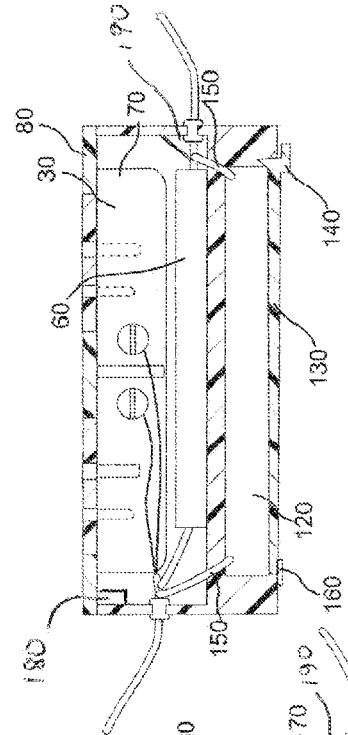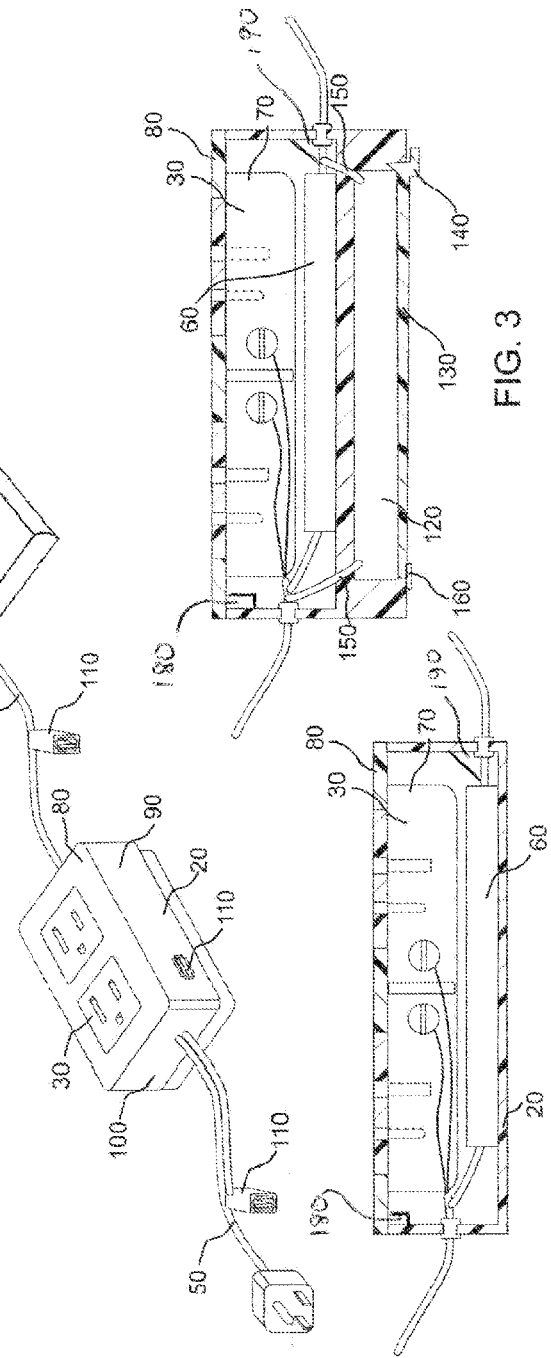

COMPUTER ADAPTER WITH POWER OUTLET AND REPLACEABLE AND RECHARGEABLE BATTERY, WIRELESS CARD, AND TRANSCEIVER

RELATED APPLICATIONS

This application is a continuation of U.S. patent application Ser. No. 13/084,498 filed Apr. 11, 2011 titled COMPUTER ADAPTER WITH POWER OUTLET.

FIELD OF THE INVENTION

This invention relates to an apparatus that is a computer adapter, such as those used or notebook computers, which is capable of receiving two and three prong power cords.

BACKGROUND OF THE INVENTION

The AC adapter's job is to take standard household AC, reduce the voltage, and convert it to tightly-regulated direct current (DC) that electronic appliances need. These appliances and their rechargeable batteries cannot use AC directly.

AC: For example, in the United States, it is typical that the electricity in your household wiring comes as 110-127 volts of 60-cycle alternating current. The AC adapter plugs into a standard outlet and feeds this AC into a small transformer. At any given moment, the average American house has 120 volts of electricity flowing through it. All of Europe and most of South America, Africa and Asia, as well as Australia and New Zealand use a supply that is within 10% of 230 V, whereas Japan, North America and some parts of northern South America use a voltage between 100 and 127 V. In general, most of the world uses the 230 V standard. This also means that standard 230 V equipment can be used in most parts of the world, with only a minor change in the equipment's electrical plug for a specific country.

Transformer: The transformer, a pair of wire coils wound on an iron frame, efficiently drops the voltage from 110 to a more useful level, such as 9 volts. Though the voltage is lower, it remains AC and needs further steps before your gadgets can use it.

Rectifier: A set of two or four diodes, connected to form a rectifier, changes the low-voltage AC to DC. This electricity, while more useful, has too much noise to power sensitive electronics.

Regulator: The adapter has a regulator circuit that holds the rectified DC to a very steady level. The voltage stays the same despite changes in the appliance's power consumption. This steady, clean DC power keeps complex electronic gadgets reliable.

Many adapters can be used in different countries. For example, the Toshiba Global AC Adapter can be used with select Toshiba notebooks. The universal 100/240 power input means one can use the AC adapter around the world with an appropriate plug adapter for whatever region he/she is traveling to.

U.S. Pat. No. 7,224,086 to Germagian et al. discloses a "Universal Multiple Device Power Adapter and Carry Case."

The main purpose of this device is for electronics to be charged through the convenience of a bag without all the cords. The power distributor that connects multiple devices has multiple ports to accommodate powering of more than two additional devices. Cords connected to the power distributor can have integrated DC/DC converters for creating any desired voltage level. However this device powers many different electronic devices, and still uses many cords in the process. Your Multiple Laptop Power Cord would be specific to standard three prong plug-in devices, such as laptops and the plug would be integrated into the voltage adapter box on the laptop cord, eliminating any excess cords.

U.S. Pat. No. 6,172,891 to O'Neal et al. discloses an "AC Voltage adapter with integrated DC Voltage Power Supply Connector." Here, the first connector "120" provides for connecting to a DC voltage operable device and the second connector "126" provides for connecting to a remote DC voltage power supply. This is not the same as your device which will plug in multiple DC voltage operable devices.

U.S. Pat. No. 5,602,455 to Stephens et al. discloses a "Portable Battery Charger with Integrally Attached Output Cable."

Here, the device charges internal and external laptop batteries at the same time. This is not the same as your device which will power two laptops simultaneously.

The prior art includes adapters without the capability for other devices to plug into the adapter.

There exists a need for an adapter capable of receiving power cords, both two prong and three prong.

There also exists a need for an adapter that has a rechargeable and replaceable battery.

Multiple embodiments of the system are disclosed herein. It will be understood that other objects and purposes of the invention, and variations thereof, will be apparent upon reading the following specification and inspecting the accompanying drawings.

REFERENCE NUMERALS LIST

10 computer adapter with power outlet
20 adapter-receptacle housing
30 receptacle
40 adapter to computer cord
50 power source to adapter-receptacle housing cord
60 adapter portion
70 receptacle portion
80 first face
90 second face
100 third face
110 USB port
120 rechargeable battery OR rechargeable and replaceable battery
130 battery cover that can open and close
140 latch mechanism for battery cover
140' latch mechanism for battery
150 electron conduit
160 hinge
170 battery back side
180 wireless card
190 transceiver

SUMMARY OF THE INVENTION

One aspect of the present invention is an electrical adapter with power outlet 10, comprising: an adapter-receptacle housing 20; a receptacle portion 70 operably disposed within said adapter-receptacle housing 20; an adapter portion 60 operably disposed within said adapter-receptacle housing 20; a receptacle 30 disposed within said receptacle portion 70, said receptacle operably connected to a power source to adapter-receptacle cord 50; an adapter to computer cord 40; said power source to adapter-receptacle cord 50 is operably connected to the receptacle 30 to provide power to a device plugged into the receptacle; said power source to adapter-receptacle cord 50 is operably connected to the adapter portion 60 to power a notebook computer; and a USB port is operatively connected to at least one of either a said power source to adapter-receptacle housing cord 50, said adapter-receptacle housing 20, or said adapter to computer cord 40. Devices can then plug into the USB port to obtain an electrical charge or power.

Another aspect of the present invention is an electrical adapter with power outlet 10, comprising: an adapter-receptacle housing 20; a receptacle portion 70 operably disposed within said adapter-receptacle housing 20; an adapter portion 60 operably disposed within said adapter-receptacle housing 20; a receptacle 30 disposed within said receptacle portion 70, said receptacle 30 operably connected to a power source to adapter-receptacle cord 50; an adapter to computer cord 40; said power source to adapter-receptacle cord 50 is operably connected to the receptacle 30 to provide power to a device plugged into the receptacle 30; said power source to adapter-receptacle cord 50 is operably connected to the adapter portion 60 to power a notebook computer; and said adapter-receptacle housing 20 has a rechargeable and replaceable batter 120 removably and operably disposed therein.

These and other features, aspects and advantages of the present invention will become better understood with reference to the following drawings, description and claims.

BRIEF DESCRIPTION OF THE DRAWINGS

FIG. 1 is a pictorial view of one embodiment of the present invention;

FIG. 2 is a pictorial view of one embodiment of the present invention shown as a cross sectional area from FIG. 1;

FIG. 3 is a pictorial view of another embodiment of the present invention;

DETAILED DESCRIPTION OF THE INVENTION

Figure 4:
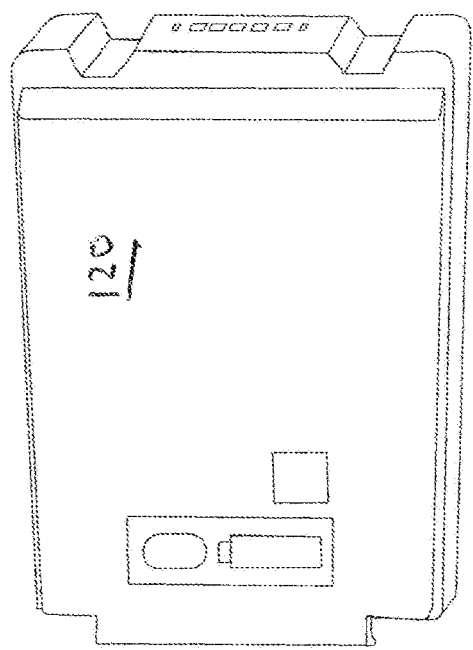
FIG. 4 is a pictorial view of a battery of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

The present invention 10 functions as an accessory, such as a notebook computer charger/power supply cord that has an additional area for another laptop to plug into the voltage adapter/power supply cord. Thus, powering two or more laptops through one cord plugged into one wall mounted power source.

The additional plug-in area may be located on the voltage adapter either internally or externally as an accessory to the power cord. In the external embodiment, the additional plug-in area could be an aftermarket product that slides on a separate adapter.

FIG. 1 illustrates one embodiment of the present, computer adapter with power outlet 10, having an adapter-receptacle housing 20, a receptacle 30 integrated or removably disposed therein. A removable adapter to computer cord 40, and a power source to adapter-receptacle housing cord 50. FIG. 1 illustrates the receptacle 30 being accessible on the first face 80. However in other embodiments the receptacle may be on other faces, for example face two 90, or face three 100. In another embodiment, the receptacles may be on more than one face. It is noted that all 6 faces of the adapter-receptacle housing are not shown.

FIG. 1 further illustrates that a universal serial bus (USB) port may be operatively disposed on at least one of either the power source to adapter-receptacle housing cord 50, the adapter-receptacle housing 20, or the adapter to computer cord 40.

FIG. 2 illustrates an embodiment of the adapter-receptacle housing 20 of the present invention 10, whereby the receptacle 30 and receptacle portion 70 is disposed upwardly from the adapter portion 60. FIG. 2 illustrates a further embodiment whereby the present invention has a wireless card 180 securely disposed within the adapter-receptacle housing 20. This enables a computer that is connected to the adapter-receptacle housing via a USB port 110, go gain wireless connection to a WIFI network. The wireless card 180 may be operably connected to either the battery 120 for power, or it may be operably connected to USB port 110, such that it may use power from any device connected to the USB port 110. FIG. 2 also illustrates a transceiver 190, which can turns off the adapter 60 by calling a cell phone number provided by any wireless carrier.

FIG. 3 illustrates a further embodiment includes a battery 120 within the adapter receptacle housing 20, that is operably connected so that it 120 can be charged via the power source to adapter-receptacle housing cord 50. A device can then be plugged into the receptacle 30 to be powered, while the present invention 10 is not plugged in to a power source. FIG. 3 illustrates a further embodiment whereby the present invention has a wireless card 180 securely disposed within the adapter-receptacle housing 20. This enables a computer that is connected to the adapter-receptacle housing via a USB port 110, go gain wireless connection to a WIFI network. The wireless card 180 may be operably connected to either the battery 120 for power, or it may be operably connected to USB port 110, such that it may use power from any device connected to the USB port 110. FIG. 3 also illustrates a transceiver 190 that can turn off the adapter 60 upon receiving a certain signal.

FIG. 3 also illustrates an embodiment having a battery cover 130 that can open and close. FIG. 3 illustrates a battery cover 130 that can open via a latch mechanism 140. The replaceable and rechargeable battery 120 may be operably connected to at least of the adapter to computer cord 40, the power source to adapter-receptacle housing cord 50, and the receptacle so that the rechargeable and replaceable battery 120 can be charged, can power a device plugged into the adapter to computer cord 40, and can power a device plugged into the receptacle 30.

Thus a device plugged into the receptacle 30 can draw power from the rechargeable battery 120. Furthermore, the rechargeable battery 120 may also be replaceable via a battery cover 130 that can open and close, similar to that of a TV remote control device. Other types of covers and openings may be used, such as those on cell phones, remote control cars, and computers.

Typical dimensions and weight of an embodiment of the present invention may be: 3."×1.4"×1.0"; and 0.37 lb. The input voltage may be in the range of: 100-240V/50-60 Hz Frequency (Universal) Input voltage; and the output may be DC 15V×3 A.

Figure 5:
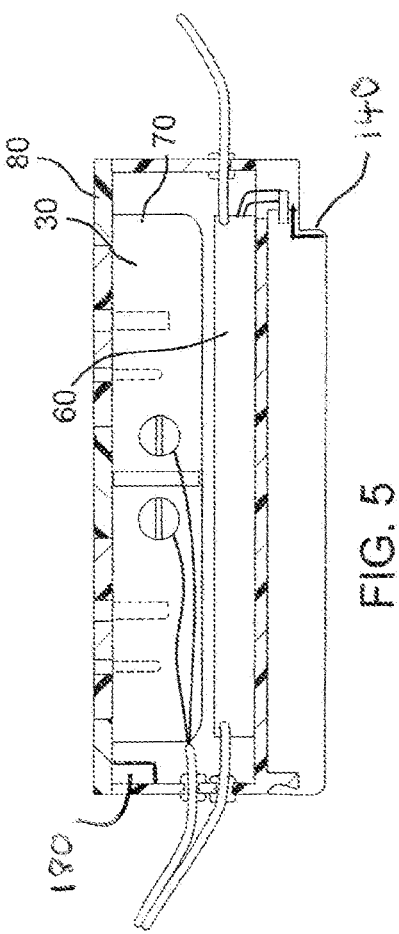
FIG. 5 is a pictorial view of an embodiment having a battery that snaps into place.

A further embodiment is illustrated in FIGS. 4 and 5, which may include a battery 120 that may be removably secured to the adapter-receptacle housing 20 without a battery cover In this embodiment, the battery 120 may snap into the adapter-receptacle housing 20 via a battery latch mechanism 140'. The battery 120 may snap in place and the battery back side 170 would be exposed as there would be no battery cover 130.

FIG. 5 also illustrates a further embodiment whereby the present invention has a wireless card 180 securely disposed within the adapter-receptacle housing 20. This enables a computer that is connected to the adapter-receptacle housing via a USB port 110, go gain wireless connection to a WIFI network.

In any of the embodiments, the transceiver 190 may be powered by the adapter. Although FIG. 5 does not illustrate the transceiver 190 or wireless card 180, the embodiment of FIG. 3 may have the transceiver 190 of the present invention.

It should be understood, of course, that the foregoing relates to exemplary embodiments of the invention and that modifications may be made without departing from the spirit and scope of the invention as set forth in the following claims.

I claim:

1. An electrical adapter with power outlet (10), comprising:
   an adapter-receptacle housing (20);
   a receptacle portion (70) operably disposed within said adapter-receptacle housing (20);
   an adapter portion (60) operably disposed within said adapter-receptacle housing (20);
   a standard three prong receptacle disposed within said receptacle portion (70), said standard three prong receptacle operably connected to a power source to adapter-receptacle cord (50);
   an adapter to computer cord (40); and
   wherein said adapter-receptacle housing (20) has a transceiver (190) secured therein, said transceiver (20) turns off the adapter (60) upon receiving a certain signal.

2. An electrical adapter with power outlet (10), comprising:
   an adapter-receptacle housing (20);
   a receptacle portion (70) operably disposed within said adapter-receptacle housing (20);
   an adapter portion (60) operably disposed within said adapter-receptacle housing (20);
   a receptacle (30) disposed within said receptacle portion (70), said receptacle (30) operably connected to a power source to adapter-receptacle cord (50);
   an adapter to computer cord (40);
   said power source to adapter-receptacle cord (50) is operably connected to the receptacle (30) to provide power to a device plugged into the receptacle (30);
   said power source to adapter-receptacle cord (50) is operably connected to the adapter portion (60) to power a notebook computer; and
   said adapter-receptacle housing (20) has a rechargeable and replaceable batter (120) removably and operably disposed therein;
   wherein said adapter-receptacle housing (20) has a transceiver (190) secured therein, said transceiver (20) turns off the adapter (60) upon receiving a certain signal.

3. The apparatus of claim 2, wherein said rechargeable and replaceable battery (120) can be removed by displacement of a latch mechanism for battery 140'.

* * * * *